(12) United States Patent
Ohta et al.

(10) Patent No.: US 7,027,714 B2
(45) Date of Patent: Apr. 11, 2006

(54) APPARATUS FOR REPRODUCTION OF VIDEO AND AUDIO WITH SUSPENSION FUNCTION

(75) Inventors: Mitsuhiko Ohta, Kawasaki (JP); Tadayoshi Kono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1278 days.

(21) Appl. No.: 09/810,497

(22) Filed: Mar. 19, 2001

(65) Prior Publication Data

US 2001/0048808 A1 Dec. 6, 2001

(30) Foreign Application Priority Data

May 31, 2000 (JP) .............................. 2000-163646

(51) Int. Cl.
*H04N 5/91* (2006.01)
(52) U.S. Cl. ........................ 386/68; 386/66; 348/423.1
(58) Field of Classification Search ................ 386/6–8, 386/66–69, 71, 96, 98; 348/423.1, 512, 515
See application file for complete search history.

(56) References Cited

U.S. PATENT DOCUMENTS 5,502,573 A * 3/1996 Fujinami ..................... 386/98
5,768,467 A * 6/1998 Kuboji et al. .................. 386/68
5,815,634 A * 9/1998 Daum et al. ................... 386/96
5,953,485 A * 9/1999 Abecassis ..................... 386/68
6,654,539 B1* 11/2003 Duruoz et al. ................ 386/68

FOREIGN PATENT DOCUMENTS

EP 0 602 943 A2 6/1994
JP 2000-48487 2/2000

OTHER PUBLICATIONS

"The Full Motion System for CD-I", van der Meer, *IEEE Transactions on Consumer Electronics*, vol. 38, No. 4, Nov. 1, 1992, pp. 910-920.

* cited by examiner

Primary Examiner—James J. Groody
Assistant Examiner—Christopher Onuaku
(74) Attorney, Agent, or Firm—Arent Fox PLLC

(57) ABSTRACT

An apparatus for reproducing video and audio includes a video decoder which receives video data coded by a unit of a first time length, an audio decoder which receives audio data coded by a unit of a second time length different from the first time length, and a synchronization control unit which suspends video output of said video decoder and audio output of said audio decoder, and resumes the audio output a certain time period after resuming the video output where the certain time period corresponds to a period from the suspension of the video output to the suspension of the audio output.

10 Claims, 9 Drawing Sheets

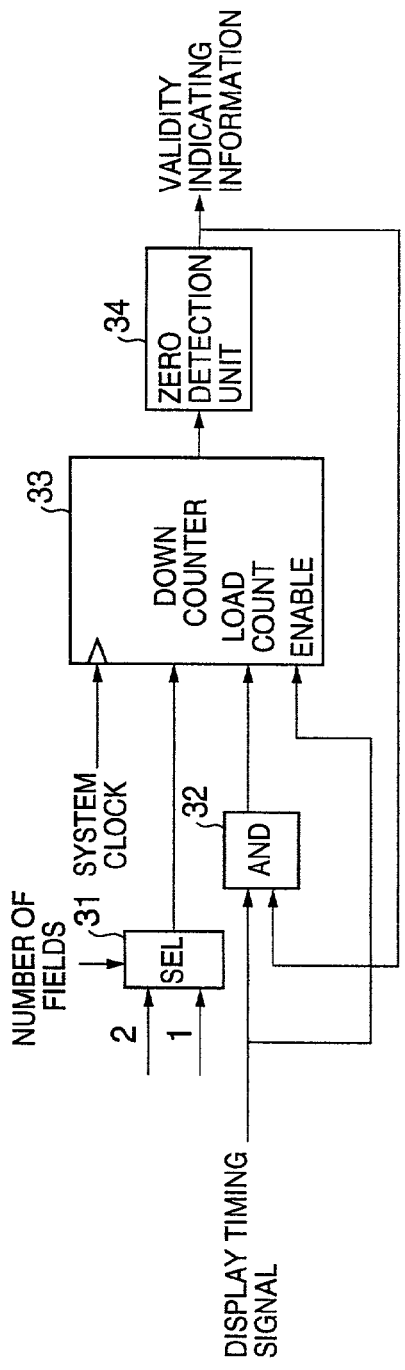
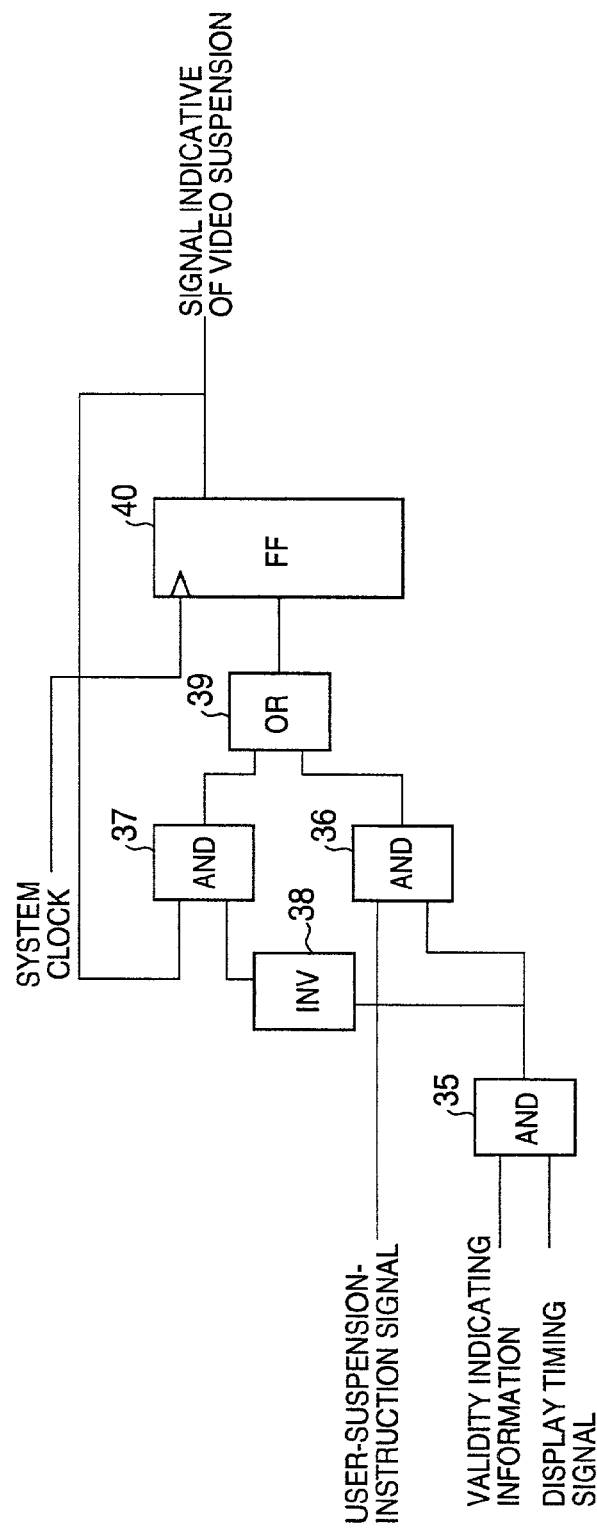

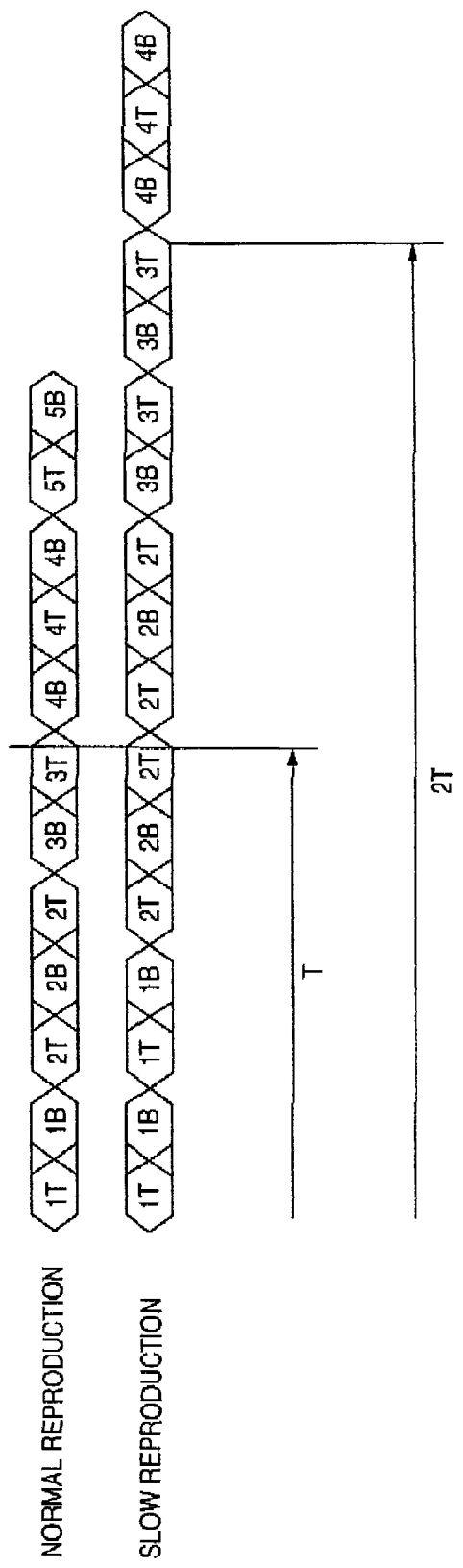

APPARATUS FOR REPRODUCTION OF VIDEO AND AUDIO WITH SUSPENSION FUNCTION

BACKGROUND OF THE INVENTION

1. Field of the Invention

The present invention generally relates to methods and apparatuses for reproducing video and audio, and particularly relates to a method and a device for reproducing video and audio that is capable of a special form of reproduction such as pause or slow reproduction of video and audio.

2. Description of the Related Art

Data of video and audio used in the DVD (digital versatile disc) or the like are compressed and coded by the MPEG or a relevant scheme (Dolby Digital, DTS, or the like), and, then, are divided into packets, each of which is provided with attached time information (PTS: presentation time stamp) for the synchronization purpose. Each packet is further provided with common time information (SCR: system clock reference) to be recorded as multiplexed coded data.

FIG. 1 is an illustrative drawing for explaining data coding and multiplexing.

Video information is coded by the unit of one field or one frame that is a basis of presentation, and audio information is also coded by the unit of one frame. One frame of audio information generally differs in length from one frame of video information. PTS is attached to each unit for coding. When one packet includes a plurality of audio frames, however, PTS is attached only to the first frame. In the example of FIG. 1, therefore, audio data frames 1, 3, and 5 each have PTS attached thereto, whereas audio data frames 2, 4, and 6 are not provided with attached PTS. These data frames are thus lacking in time information.

When data is reproduced, the multiplexed video/audio codes are separated and decoded, and, at the same time, a system clock is generated based on SCR, i.e., the system time reference. By using the system time clock as a reference, decoded video data and audio data are output at timings specified by the attached PTSs.

In general, video information is presented on a display device such as a TV set, so that timings of presentation are restricted by synchronizing clock timings of the device. For example, therefore, the system time clock is counted based on the synchronizing clock timing, and pictures are presented at such timings as the count corresponds to the PTSs. Audio data has a frame length different from that of video frames, so that the audio data is not reproduced at the same timing as the video data. The audio data is reproduced by determining its own output timings based on PTSs of the audio data. With respect to an audio data frame that has no PTS attached thereto, audio data is output continuously without any gap following the previous frame, thereby maintaining synchronization with the video presentation.

A special form of reproduction such as pause or slow reproduction may be performed. In the case of pause reproduction, a picture corresponding to the paused timing is repeatedly presented for paused video presentation, and audio data is suspended. In the case of slow reproduction, short duration of pause and play is repeated as many times as necessary.

FIG. 2 is an illustrative drawing for explaining pausing of reproduction and resuming of reproduction.

FIG. 2 shows a case in which the user instructs pause during presentation of a second video picture. In response to the user's pause instruction, the video picture 2 is displayed again after the completion of current presentation of the video picture 2. As long as the pause state continues, the video picture 2 is repeatedly displayed. When the user instructs the pause, a third audio frame is being reproduced. Accordingly, reproduction of audio data is suspended after the end of reproduction of the audio frame 3.

When the user's pause instruction comes to an end, a next video picture 3 is presented after waiting for completion of the video picture 2 that is currently displayed as part of the pause operation. As shown at the top of FIG. 2, it is desirable to resume reproduction of audio data in correct synchronization with the video data halfway through the presentation of the resumed video picture 3. If the audio data frame 4 is provided with a PTS, reproduction of the audio data frame 4 can be properly started at the timing indicated by the PTS.

If the audio data frame 4 is not provided with a PTS, however, it is uncertain when the reproduction of the audio data frame 4 should be resumed. In such a case, the audio data frame 4 having no PTS may be discarded as shown in Conventional Audio Reproduction Method 1 of FIG. 2, and the next audio data frame 5 having a PTS may be presented at the timing specified by this PTS. When this is done, however, audio for the audio data frame 4 is lost, resulting in silent reproduction of video information.

Alternatively, as shown in Conventional Audio Reproduction Method 2 of FIG. 2, the audio data frame 4 having no PTS may be reproduced concurrently with the start of reproduction of video information, with timing of audio reproduction being adjusted according to the PTS of the next data frame 5 at the time of reproduction of the audio data frame 5 having the PTS attached thereto. In this case, however, noise is audible at the gap between the audio data frame 4 and the audio data frame 5.

Accordingly, there is a need for a scheme that can properly resume reproduction of audio information after completing a pause of video and audio information.

Another drawback of the related art relates to a special form of reproduction for reproduction of a movie or the like on the TV set. Movies have 24 frames per second, whereas the NTSC standard of TV sets includes 30 frames per second, for example. Here, each TV frame is comprised of two fields. When movies are presented on the TV set, there is a need to allocate 60 TV fields per second to 24 movie frames per second. To this end, some movie frames each have two TV fields allocated thereto, and the other movie frames each have three TV fields allocated thereto, thereby establishing proper correspondences between 60 TV fields and 24 movie frames.

When a special form of reproduction is carried out with respect to such video information as configured above, a problem may be encountered since movie frames each corresponding to two fields are mixed with movie frames each corresponding to three fields. As previously described, slow reproduction is performed by repeating a short duration of pause followed by a short duration of play. During the pause operation, a frame having three fields attached thereto may be displayed. If the slow reproduction is designed to repeat pause operation by treating frames as simply having two fields, therefore, a timing displacement is bound to arise.

FIG. 3 is an illustrative drawing for explaining slow reproduction when two field frames and three field frames are mixed together.

As shown in FIG. 3, a video signal includes a first frame comprised of two fields 1T and 1B, a second frame comprised of three fields 2T, 2B, and 2T, a third frame comprised of two fields 3B and 3T, a fourth frame comprised of three fields 4B, 4T, and 4B, and a fifth frame comprised of two fields 5T and 5B.

When this video signal is presented in slow reproduction, the first frame comprised of the two fields 1T and 1B is displayed first, and, then, these two fields 1T and 1B are repeated again in the same manner as during pause operation. Then, the second frame comprised of the three fields 2T, 2B, and 2T are displayed, followed by the first two fields 2T and 2B of these three fields 2T, 2B, and 2T being displayed again. Further, the third frame comprised of the two fields 3B and 3T is displayed, and, then, these two fields 3B and 3T are repeated again in the same manner as during pause operation. When this is done, the time length having passed for the slow reproduction comes short of the time length 2T that is double the time length T required for normal reproduction of the first through third frames, stopping at the end of the time length TS. This is because the second frame comprised of the three fields 2T, 2B, and 2T is simply treated as a frame having two fields, and only the two fields 2T and 2B are repeated when reproduced as part of the pause operation.

In this case, therefore, the user may assume half-as-slow reproduction, yet the passage of time does not correspond to 2T that is two times as long as T. The actual passage of time is TS, which means a failure to achieve half-as-slow reproduction.

In this manner, even when two-field frames and three-field frames are mixed together, the related-art method repeats reproduction for pause operation by treating one frame as simply having two fields. As a result, actual reproduction time ends up differing from the supposed time length.

Accordingly, there is a need for a scheme that performs pause operation according to the actual number of fields by discriminating three-field frames from two-field frames when reproduction of video and audio is paused.

In summary, there is a need for a scheme that can properly resume reproduction of audio information after completing a pause of video and audio information.

Further, there is a need for a scheme that performs pause operation according to the actual number of fields by discriminating three-field frames from two-field frames when reproduction of video and audio is paused.

SUMMARY OF THE INVENTION

It is a general object of the present invention to provide an apparatus that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an apparatus for reproducing video and audio including a video decoder which receives video data coded by a unit of a first time length, an audio decoder which receives audio data coded by a unit of a second time length different from the first time length, and a synchronization control unit which suspends video output of the video decoder and audio output of the audio decoder, and resumes the audio output a certain time period after resuming the video output where the certain time period is identical in length to a period from the suspension of the video output to the suspension of the audio output.

The apparatus as described above measures a time period from the suspension of output of the video decoder to the suspension of output of the audio decoder, and resumes the audio decoder output upon passage of time the same length as the measured time period after resuming the video decoder output. According to an embodiment of the present invention, the apparatus measures a time period from a signal indicative of suspension of reproduction of the video decoder and the audio decoder to a first audio frame change signal. Then, a suspension instruction directed to the audio decoder is cancelled upon passage of the time period identical to the measured time period after the instruction for resuming the video decoder In this manner, a time period from the suspension of video output to the actual suspension of audio output is measured at the time of suspension, and the reproduction of the audio output is resumed upon passage of a time period identical to the measured time period following the resumption of the video output. This makes it possible to maintain synchronization between the video reproduction and the audio reproduction even when the audio data has no time information attached thereto.

According to one aspect of the present invention, the apparatus as described above is such that a period of the suspension of video output is adjusted according to how many fields are included in one frame of the video data. For example, the number of fields that are repeated for presentation during the suspension of video output is equal to the number of fields presented during normal reproduction. This makes it possible to make the time passage for slow reproduction an exact number of times as long as the time passage for normal reproduction.

According to another aspect of the present invention, a method of reproducing video and audio includes the steps of outputting video data after receiving and decoding the video data coded by a unit of a first time length, outputting audio data after receiving and decoding the audio data coded by a unit of a second time length different from the first time length, suspending video output and audio output, resuming the video output, and resuming the audio output a certain time period after the resuming the video output where the certain time period corresponds to a period from the suspension of the video output to the suspension of the audio output.

BRIEF DESCRIPTION OF THE DRAWINGS

FIGS. 7A and 7B are circuit diagrams showing a partial configuration of the synchronization control unit that generates a signal indicative of video suspension;

FIG. 9 is an illustrative drawing showing the way the slow reproduction is performed according to the present invention when two-field frames and three-field frames are mixed together.

DESCRIPTION OF THE PREFERRED EMBODIMENTS

In the following, embodiments of the present invention will be described with reference to the accompanying drawings.

Figure 1:
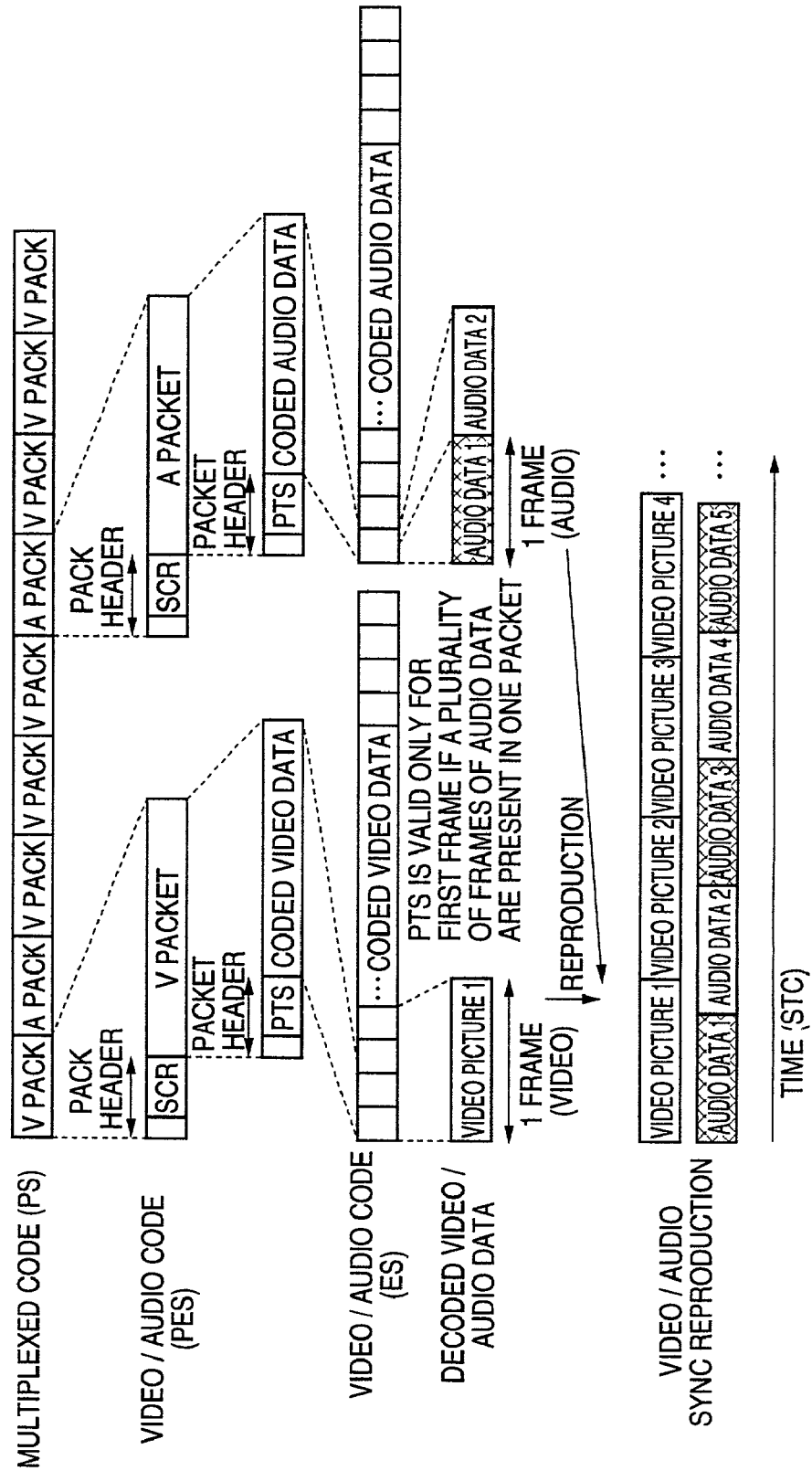
FIG. 1 is an illustrative drawing for explaining data coding and multiplexing.
Figure 2:
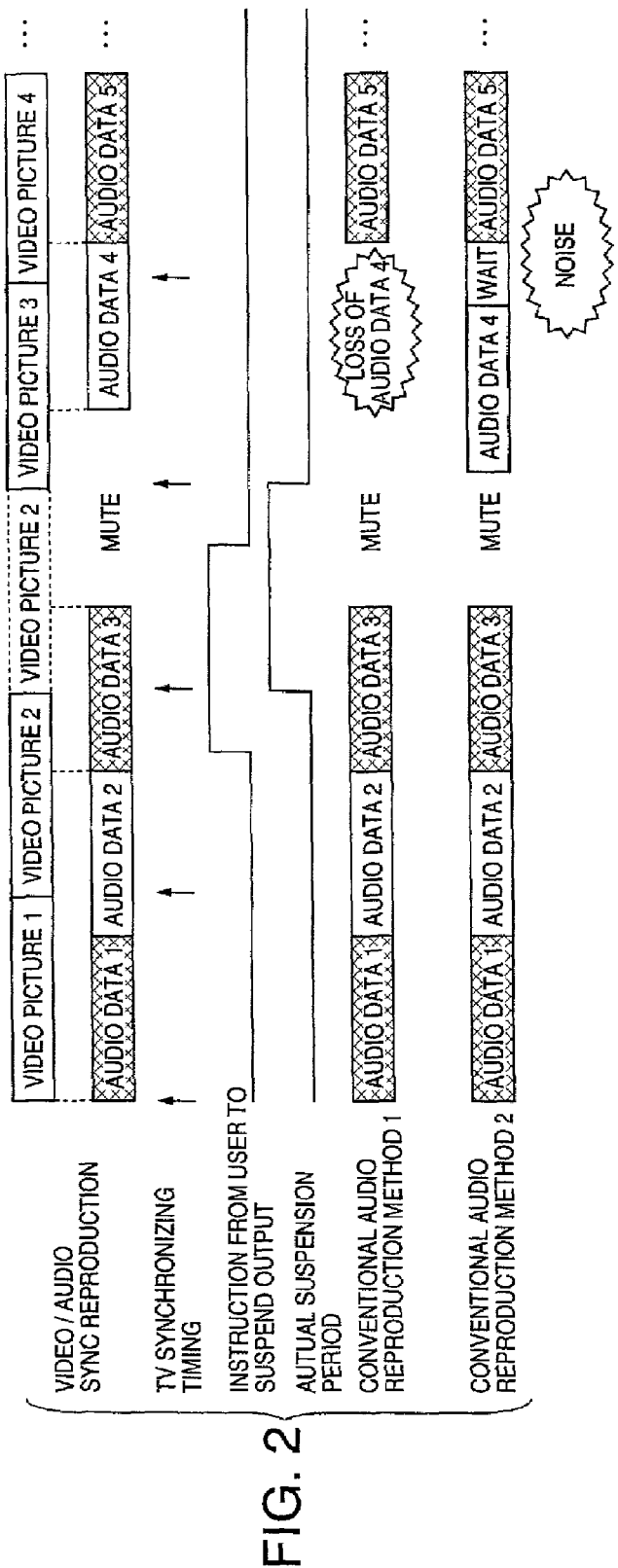
FIG. 2 is an illustrative drawing for explaining pausing of reproduction and resuming of reproduction.
Figure 3:
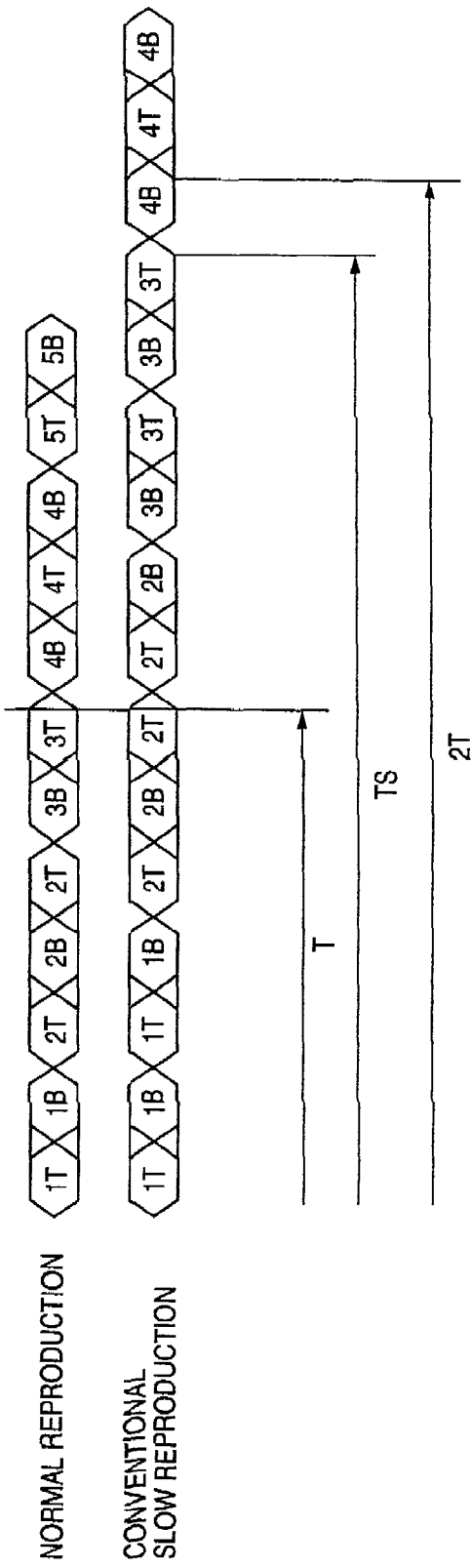
FIG. 3 is an illustrative drawing for explaining slow reproduction when two-field frames and three-field frames are mixed together.
Figure 4:
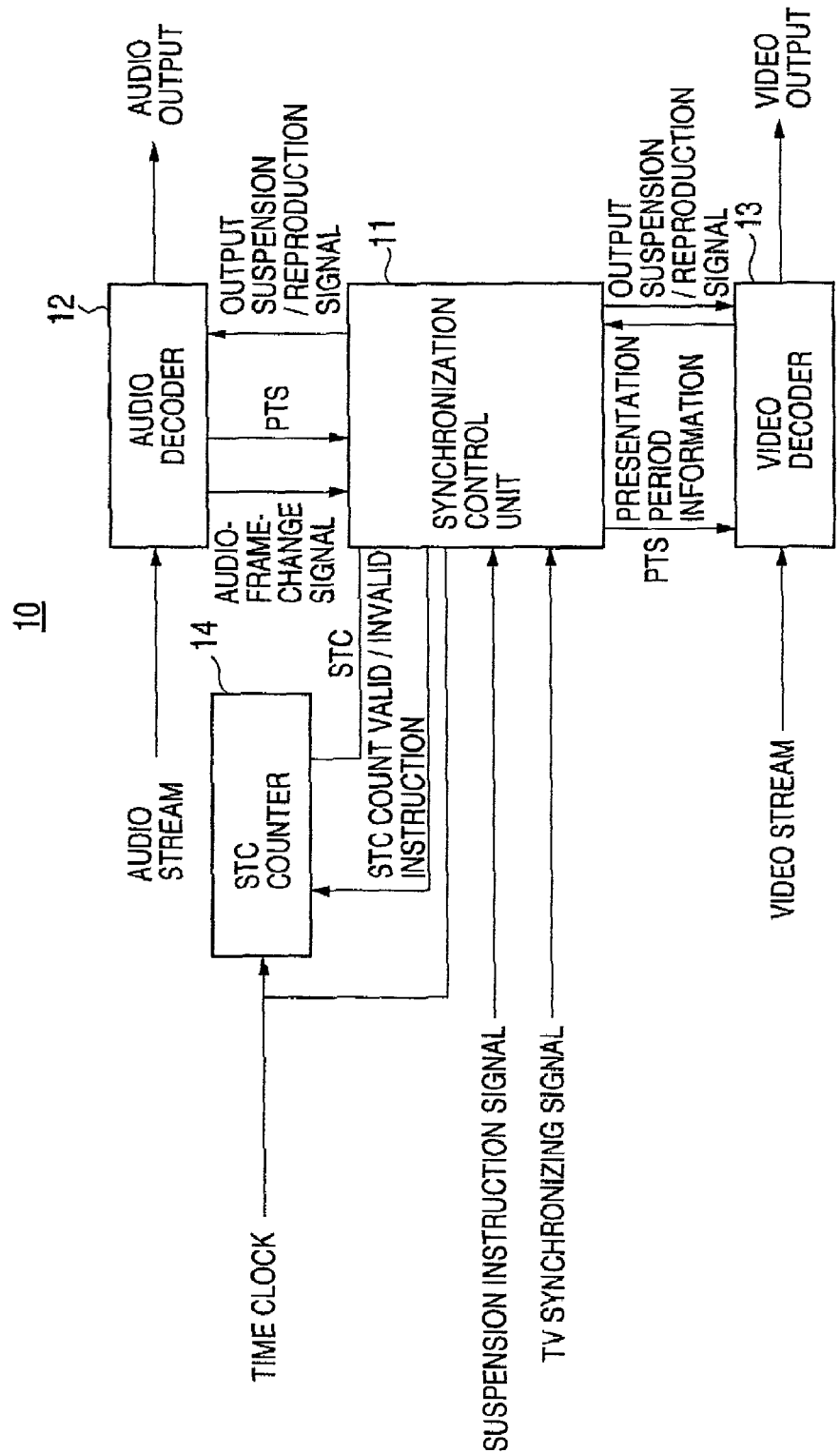
FIG. 4 is a block diagram of an audio and video decoder according to the present invention.

FIG. 4 is a block diagram of an audio and video decoder according to the present invention.

An audio and video decoder 10 of FIG. 4 includes a synchronization control unit 11, an audio decoder 12, a video decoder 13, and an STC counter 14.

The audio decoder 12 receives an audio stream separated from a multiplexed code stream, and decodes the received stream to produce audio output. Further, the audio decoder 12 supplies PTS (time information) and an audio-frame-change signal indicative of each boundary between audio frames to the synchronization control unit 11 where the PTS is extracted from the audio stream.

The video decoder 13 receives a video stream separated from the multiplexed code stream, and decodes the received stream to produce video output. Further, the video decoder 13 supplies PTS (time information) and presentation-period information indicative of a valid period of video presentation to the synchronization control unit 11 where the PTS is extracted from the video stream.

The STC counter 14 receives a time clock signal, and counts a system time clock STC based on the time clock signal. The counting of the system time clock STC is controlled in terms of counting or suspending of counting by an STC count valid/invalid instruction supplied from the synchronization control unit 11.

The synchronization control unit 11 receives the time clock, the system time clock STC, and the TV synchronizing signal, and attends to synchronization control of the audio output of the audio decoder 12 and the video output of the video decoder 13. Further, the synchronization control unit 11 receives a suspension instruction signal indicative of suspension (pause) of the audio and video reproduction, and controls the audio decoder 12 and the video decoder 13 based on the suspension instruction signal to suspend the audio and video reproduction.

In detail, when the suspension instruction signal is generated in response to a user request, the synchronization control unit 11 turns output suspension/reproduction signals thereof into a suspension state where the output suspension reproduction signals are supplied to the audio decoder 12 and the video decoder 13. As a result, the audio decoder 12 and the video decoder 13 are instructed to suspend respective reproductions. When detecting suspension of video reproduction based on display period information from the video decoder 13 and the TV synchronizing signal, the synchronization control unit 11 instructs the STC counter 14 to cancel the counting of the STC, thereby stopping the counting of the system time clock STC.

The audio decoder 12 generally produces audio output by the unit of one audio frame. When the output suspension/reproduction signal thereof indicates the suspension state, the audio output is suspended after the completion of reproduction of the currently reproduced audio frame. Accordingly, actual timing of audio output suspension corresponds to the audio-frame-change signal that appears first after the instruction of suspension.

The synchronization control unit 11 measures a time period from the suspension of video reproduction to the actual suspension of audio reproduction. Here, the suspension of video reproduction is marked by the timing at which the output suspension/reproduction signal supplied to the audio decoder 12 is changed to the suspension state, and the actual suspension of audio reproduction is marked by the first audio-frame-change signal. In detail, this time period is measured by counting the time clock signal from the rising edge of the output suspension/reproduction signal to the first audio-frame-change signal.

When the suspension instruction signal comes to an end in response to the user's request for resuming the reproduction, the synchronization control unit 11 cancels the suspension instruction directed to the audio decoder 12, the video decoder 13, and the STC counter 14. Since the video output can be presented at a video display timing, the output suspension/reproduction signal to the video decoder 13 is disengaged from the suspension state thereof in response to the timing of the TV synchronizing signal. The count valid instruction is supplied to the STC counter 14 at such timing as indicated by the display period information from the video decoder 13 and the TV synchronizing signal. This cancels the suspension of counting.

In the present invention, the timing at which the audio reproduction is resumed, i.e., the timing at which the synchronization control unit 11 cancels the suspension instruction directed to the audio decoder 12, is different form that of the related art. In the related art, the audio reproduction may wait for an audio frame having a PTS attached thereto, or may be resumed for the time being, followed by timing adjustment performed upon arrival of an audio frame having a PTS attached thereto. The present invention measures a time period from the signal indicative of suspension of reproduction of the video decoder and the audio decoder to the first audio-frame-change signal. Then, the suspension instruction directed to the audio decoder 12 is cancelled upon passage of the time period identical to the measured time period after the instruction for resuming the video decoder.

In this manner, a time period from the suspension of video output to the actual suspension of audio output is measured at the time of suspension, and the reproduction of the audio output is resumed upon passage of a time period identical to the measured time period following the resumption of the video output. This makes it possible to maintain synchronization between the video reproduction and the audio reproduction.

Figure 5:
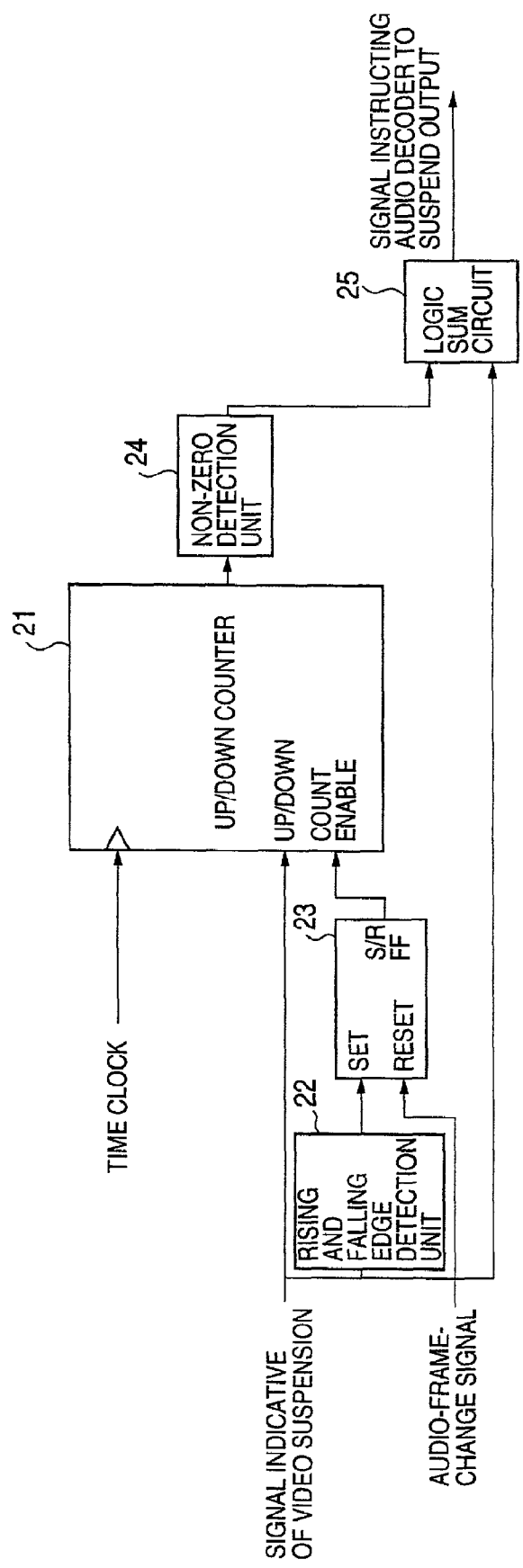
FIG. 5 is a circuit diagram showing a partial configuration of a synchronization control unit that measures a time period from suspension of video output to actual suspension of audio output.

FIG. 5 is a circuit diagram showing a partial configuration of the synchronization control unit 11 that measures a time period from the suspension of video output to the actual suspension of audio output.

The circuit of FIG. 5 includes an up/down counter 21, a rising and falling edge detection unit 22, a set-reset flip-flop 23, a non-zero detection unit 24, and a logic sum circuit 25.

Figure 6:
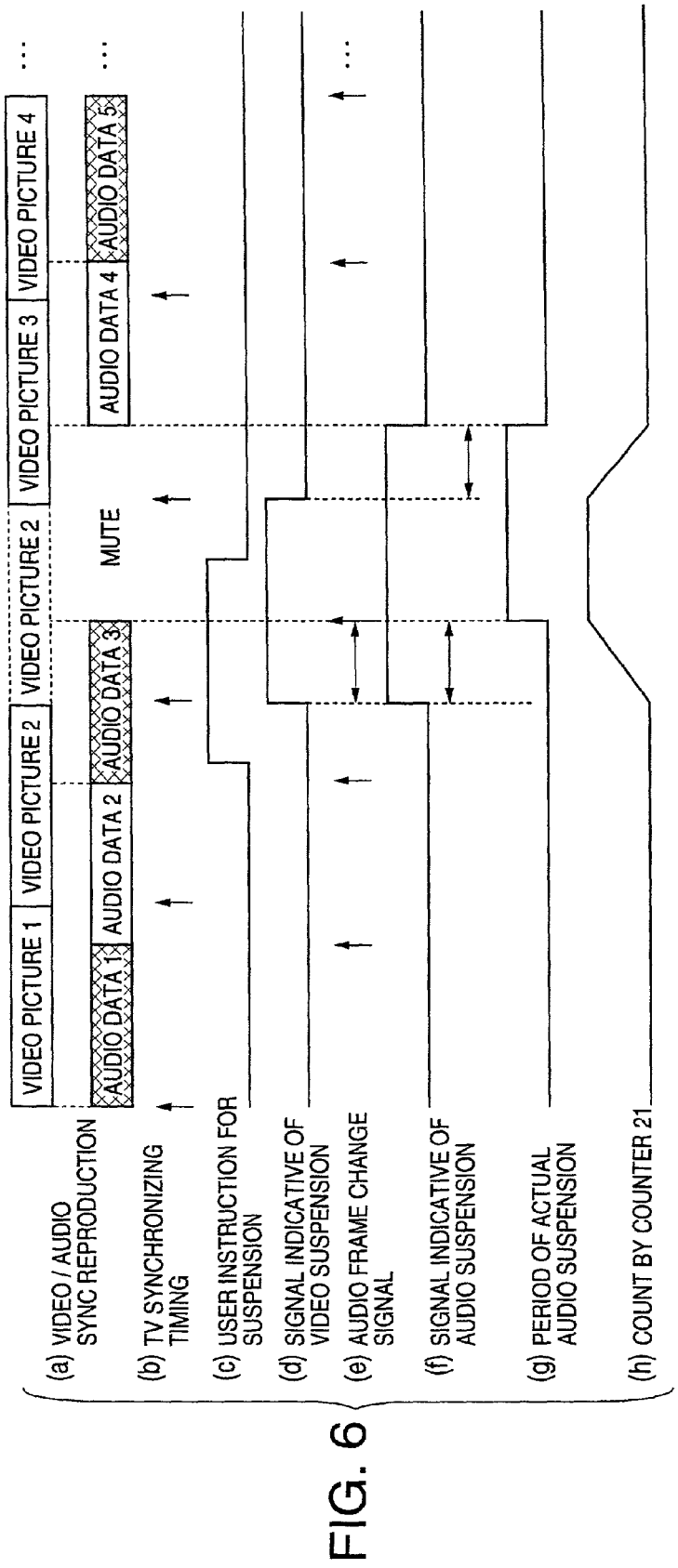
FIG. 6 is a timing chart showing operation of configurations shown in FIG. 4 and FIG. 5.

FIG. 6 is a timing chart showing operation of the configuration shown in FIG. 4 and FIG. 5.

When the user instructs suspension (pause) as shown in (c) of FIG. 6, the synchronization control unit 11 supplies a signal indicative of video suspension to the video decoder 13 as shown in (d) of FIG. 6. The timing at which this signal is supplied corresponds to the timing of the TV synchronizing signal shown in (b) of FIG. 6. The provision of the signal indicative of video suspension corresponds to the change to the suspension stage of the output suspension/reproduction signal supplied form the synchronization control unit 11 to the video decoder 13 in FIG. 4. Together with the signal indicative of the video suspension, the synchronization control unit 11 supplies a signal indicative of audio suspension to the audio decoder 12 as shown in (f) of FIG. 6.

The rising and falling edge detection unit 22 shown in FIG. 5 detects a rising edge of the signal indicative of video suspension so as to set the set-reset flip-flop 23. This results in an count enable input to the up/down counter 21 being enabled. At the same time, also, the signal indicative of video suspension that is HIGH is supplied to an up/down input of the up/down counter 21, thereby placing it in a condition for count-up operation. Accordingly, in response to the rising edge of the signal indicative of video suspension, the up/down counter 21 starts to count the time clock. The way the count increases is shown as an incremental slope shown in (h) of FIG. 6.

Then, the audio-frame-change signal is supplied from the audio decoder 12 to the synchronization control unit 11 as shown in (e) of FIG. 6. This audio-frame-change signal is supplied to a reset input of the set-reset flip-flop 23 shown in FIG. 5, thereby resetting the set-reset flip-flop 23. As a result, the count enable input to the up/down counter 21 is disabled, so that the up/down counter 21 stops the counting-up operation. In this manner, a time period from the suspension of vide reproduction to the actual suspension of audio output is stored in the up/down counter 21 as a count of the time clock pulses.

After this, the suspension instruction made by the user is cancelled as shown in (c) of FIG. 6. In response, the signal indicative of video suspension shown in (d) of FIG. 6 is inactivated at the timing of the TV synchronizing signal shown in (b) of FIG. 6.

When this happens, the rising and falling edge detection unit 22 of FIG. 5 detects the falling edge of the signal indicative of video suspension, thereby setting the set-reset flip-flop 23. This results in the count enable input of the up/down counter 21 being enabled. At the same time, also, the signal that is LOW is supplied to an up/down input of the up/down counter 21, thereby placing it in a condition for countdown operation. Accordingly, in response to the falling edge of the signal indicative of video suspension, the up/down counter 21 starts a countdown by counting the time clock. The up/down counter 21 stops the countdown when the count becomes zero. The way the count decreases is shown as a climbing down slope shown in (h) of FIG. 6.

When the count of the up/down counter 21 becomes zero, the output of the non-zero detection unit 24 supplied to the logic sum circuit 25 changes from HIGH to LOW. The logic sum circuit 25 obtains a logic sum (OR) of the output of the non-zero detection unit 24 and the signal indicative of video suspension, thereby producing the signal indicative of audio suspension as shown in (f) of FIG. 6. Here, the OR operation by the logic sum circuit 25 is performed in consideration of reliability of intended circuit operation even under presence of minor timing displacement. In principle, the signal indicative of audio suspension may be generated according to the HIGH/LOW status of the non-zero detection unit 24 (i.e., according to zero/non-zero status of the output of the up/down counter 21).

The signal indicative of audio suspension as shown in (f) of FIG. 6 is supplied from the synchronization control unit 11 to the audio decoder 12. As a result, a period during which the audio output is actually suspended corresponds to the period shown in (g) of FIG. 6. The period for audio suspension shown in (g) of FIG. 6 is the same length as the period of the signal indicative of video suspension shown in (d) of FIG. 6, i.e., is the same length as the period of video output suspension. Accordingly, the audio output, when resumed, is kept in synchronization with the video output.

FIGS. 7A and 7B are circuit diagrams showing a partial configuration of the synchronization control unit 11 that generates the signal indicative of video suspension. FIGS. 7A and 7B are different portions of the circuit that generates the signal indicative of video suspension, and together constitute the entirety of this circuit.

The circuit portion shown in FIG. 7A includes a selector 31, an AND circuit 32, a down counter 33, and a zero-detection circuit 34. The circuit portion shown in FIG. 7B includes AND circuits 35 through 37, an inverter 38, an OR circuit 39, and a flip-flop 40.

Figure 8:
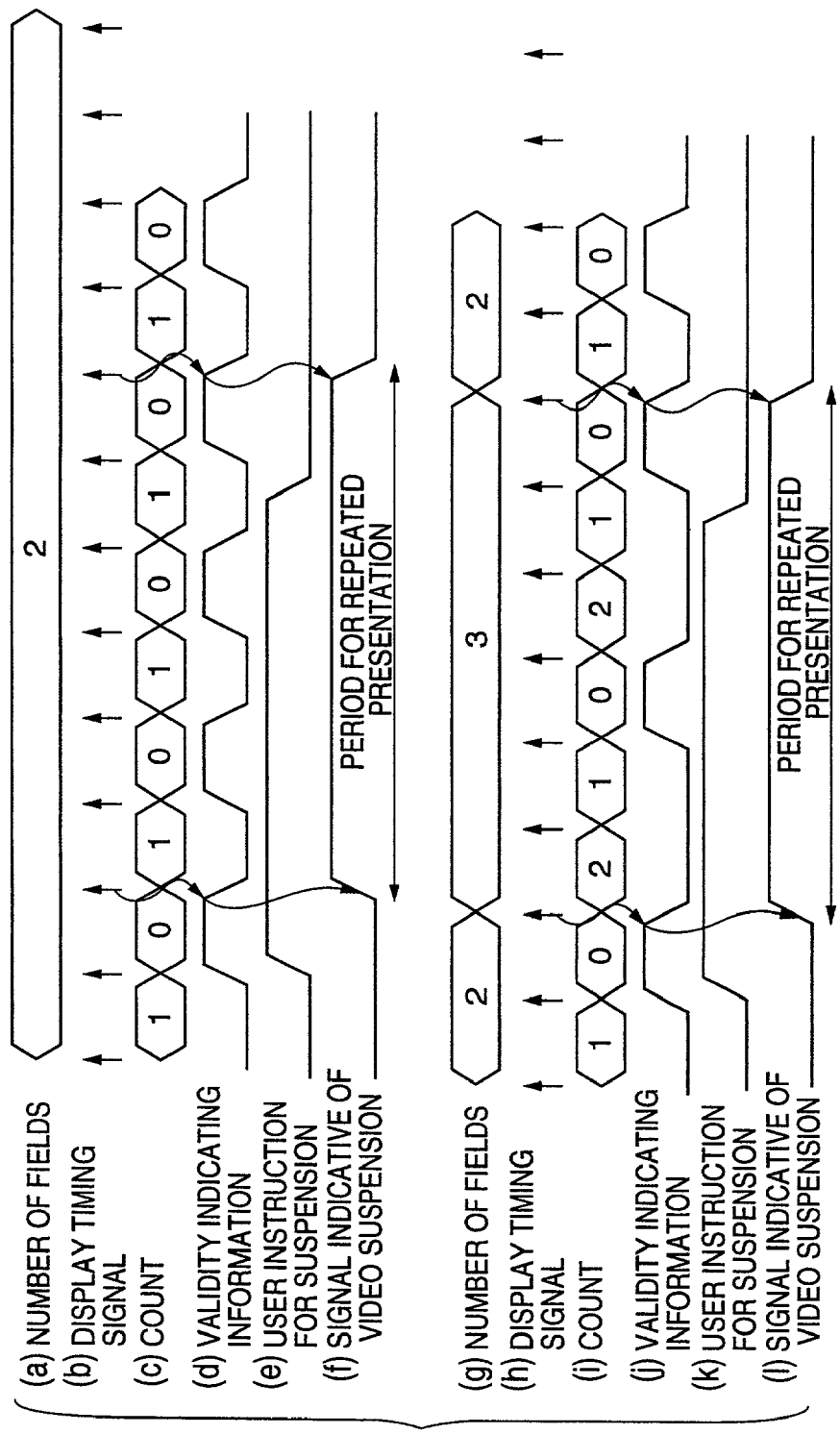
FIG. 8 is a timing chart for explaining operation of the circuit of FIG. 7A and FIG. 7B.

FIG. 8 is a timing chart for explaining operation of the circuit of FIG. 7A and FIG. 7B. In the following, operation of the circuit of FIGS. 7A and 7B will be described with reference to FIG. 8.

The selector 31 shown in FIG. 7A receives information indicative of the number of frames from the video decoder 13 where the information is derived by decoding the video stream. The information indicative of the number of fields specifies whether the currently presented frame is comprised of two fields or comprised of three fields. The selector 31 selects "1" when the information indicative of the number of fields indicates two fields, and selects "2" when the information indicative of the number of fields specifies three fields. The selected value is loaded into the down counter 33.

FIG. 8, in (a) through (f), shows a case in which the information indicative of the number of fields specifies two fields, with the down counter 33 downloading "1". FIG. 8, in (g) through (1), shows a case in which the information indicative of the number of fields specifies three fields, with the down counter 33 downloading "2". In the respective cases, (a) and (g) of FIG. 8 illustrate the information indicative of the number of fields, and (c) and (i) of FIG. 8 demonstrate the count by the counter.

The value that is loaded into the down counter 33 is subjected to countdown operation based on the system clock signal. The output of the down counter 33 is supplied to the zero-detection circuit 34. When the count becomes zero, validity indicating information that is output from the zero-detection circuit 34 becomes HIGH as shown in (d) and (j) of FIG. 8.

The validity indicating information and a display timing signal ((d) and (h) of FIG. 8) are supplied to the AND circuit 32, and the output of the AND circuit 32 is supplied to a load request input of the down counter 33. Accordingly, a new value is loaded into the down counter 33 each time the count becomes zero.

The validity indicating information that is output from the zero-detection circuit 34 is supplied to the circuit of FIG. 7B, and is combined with a user-suspension-instruction signal responsive to a user request or the like. As a result, the signal indicative of video suspension as shown in (f) and (l) of FIG. 8 is obtained.

In the present invention, as shown in FIGS. 7A and 7B and FIG. 8, the value selected according to the number of fields is subjected to countdown operation where the number of fields is indicated by the information indicative of the number of fields. A timing at which the count of the countdown becomes zero is detected, so that a time period corresponding to the total number of fields per frame can be measured. Based on the measured time period, the signal indicative of video signal suspension is generated. This makes it possible to repeat presentation of fields as many as there are fields, the number of which is two or three indicated by the information indicative of the number of fields.

FIG. 9 is an illustrative drawing showing the way the slow reproduction is performed according to the present invention when two-field frames and three-field frames are mixed together.

The slow reproduction of FIG. 9 corresponds to a case in which a short duration of pause and a short duration of play are repeated based on the signal indicative of video suspension generated by the circuit of FIGS. 7A and 7B as shown in FIG. 8.

As shown in FIG. 9, a video signal includes a first frame comprised of two fields 1T and 1B, a second frame comprised of three fields 2T, 2B, and 2T, a third frame comprised of two fields 3B and 3T, a fourth frame comprised of three fields 4B, 4T, and 4B, and a fifth frame comprised of two fields 5T and 5B.

When this video signal is presented in slow reproduction, the first frame comprised of the two fields 1T and 1B is displayed first, and, then, these two fields 1T and 1B are repeated again as part of pause operation. Then, the second frame comprised of the three fields 2T, 2B, and 2T are displayed, followed by these three fields 2T, 2B, and 2T being displayed again during pause operation. Further, the third frame comprised of the two fields 3B and 3T is displayed, and, then, these two fields 3B and 3T are repeated again as part of pause operation. When this is done, the time length having passed for the slow reproduction corresponds to the time length 2T that is two times the time length T required for normal reproduction of the first through third frames.

In this case, therefore, the user assumes half-as-slow reproduction, and the passage of time for the slow reproduction exactly corresponds to two times the time length T. Further, when one-third-slow reproduction is intended, for example, the actual passage of time for slow reproduction exactly becomes three times as long.

In the embodiments described above, the synchronization control unit 11, the audio decoder 12, and the video decoder 13 may be implemented as circuitry, or may be implemented as software based on the DSP (digital signal processor) or the like.

Further, the present invention is not limited to these embodiments, but various variations and modifications may be made without departing from the scope of the present invention.

The present application is based on Japanese priority application No. 2000-163646 filed on May 31, 2000, with the Japanese Patent Office, the entire contents of which are hereby incorporated by reference.

What is claimed is:

1. An apparatus for reproducing video and audio, comprising:
   a video decoder which receives video data coded by a unit of a first time length;
   an audio decoder which receives audio data coded by a unit of a second time length different from the first time length;
   a synchronization control unit which suspends video output of said video decoder and audio output of said audio decoder, and resumes the audio output a certain time period after resuming the video output where the certain time period corresponds to a period from the suspension of the video output to the suspension of the audio output.

2. The apparatus as claimed in claim 1, wherein the audio data coded by the unit of the second time length includes coded data with time information attached thereto and coded data with no time information attached thereto.

3. The apparatus as claimed in claim 2, wherein said audio decoder notifies said synchronization control unit of timings of borders of each time unit equal to the second time length by which the audio data is output.

4. The apparatus as claimed in claim 3, wherein said synchronization control unit includes:
   a counter which measures a first time period from a time of instruction to said video decoder to suspend the video output to a time of the suspension of the audio output, and counts a second time period equal to the first time period starting from a time of instruction to said video decoder to resume the video output; and
   a unit which instructs said audio decoder to suspend the audio output based on the instruction to said video decoder to suspend the video output, and instructs said audio decoder to resume the audio output when said counter marks the second time period.

5. The apparatus as claimed in claim 4, wherein said counter detects the time of the suspension of the audio output based on said timings of borders of each time unit.

6. The apparatus as claimed in claim 1, wherein a period of the suspension of the video output is adjusted according to how many fields are included in one frame of the video data.

7. The apparatus as claimed in claim 1, wherein a number of fields that are repeated for presentation during the suspension of the video output is equal to a number of fields presented during normal reproduction.

8. A method of reproducing video and audio, comprising the steps of:
   outputting video data after receiving and decoding the video data coded by a unit of a first time length;
   outputting audio data after receiving and decoding the audio data coded by a unit of a second time length different from the first time length;
   suspending video output and audio output;
   resuming the video output; and
   resuming the audio output a certain time period after said resuming the video output where the certain time period corresponds to a period from the suspension of the video output to the suspension of the audio output.

9. The method as claimed in claim 8, wherein the audio data coded by the unit of the second time length includes coded data with time information attached thereto and coded data with no time information attached thereto.

10. A system for reproducing video and audio, comprising:
   a video decode unit which receives video data coded by a unit of a first time length;
   an audio decode unit which receives audio data coded by a unit of a second time length different from the first time length;
   a synchronization control unit which suspends video output of said video decode unit and audio output of said audio decode unit, and resumes the audio output a certain time period after resuming the video output where the certain time period corresponds to a period from the suspension of the video output to the suspension of the audio output.

* * * * *